United States Patent [19]

(12) United States Patent
Lakshmanamurthy et al.

(10) Patent No.: US 7,536,692 B2
(45) Date of Patent: May 19, 2009

(54) THREAD-BASED ENGINE CACHE PARTITIONING

(75) Inventors: Sridhar Lakshmanamurthy, Sunnyvale, CA (US); Wilson Y. Liao, Belmont, CA (US); Prashant R. Chandra, Sunnyvale, CA (US); Jeen-Yuan Miin, Palo Alto, CA (US); Yim Pun, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 645 days.

(21) Appl. No.: 10/704,431

(22) Filed: Nov. 6, 2003

(65) Prior Publication Data

US 2005/0102486 A1    May 12, 2005

(51) Int. Cl.
  *G06F 9/46*    (2006.01)
  *G06F 12/00*    (2006.01)
(52) U.S. Cl. ............................. 718/104; 718/100; 711/3; 711/113; 711/118; 711/119; 711/121; 711/129; 711/130
(58) Field of Classification Search ............. 718/1–108; 711/141, 119–124, 140–146, 3, 113, 118, 711/125, 126, 129, 130, 147, 148
See application file for complete search history.

(56) References Cited

U.S. PATENT DOCUMENTS

| | | | | |
|---|---|---|---|---|
| 5,946,711 | A * | 8/1999 | Donnelly | 711/152 |
| 6,021,471 | A * | 2/2000 | Stiles et al. | 711/140 |
| 6,049,867 | A * | 4/2000 | Eickemeyer et al. | 712/228 |
| 6,078,994 | A * | 6/2000 | Carey | 711/133 |
| 6,427,192 | B1 * | 7/2002 | Roberts | 711/133 |
| 6,446,143 | B1 | 9/2002 | Razdan et al. | |
| 6,574,712 | B1 * | 6/2003 | Kahle et al. | 711/137 |
| 6,606,704 | B1 | 8/2003 | Adiletta et al. | |
| 6,668,317 | B1 | 12/2003 | Bernstein et al. | |
| 6,862,027 | B2 * | 3/2005 | Andrews et al. | 345/505 |
| 6,915,415 | B2 * | 7/2005 | Mayfield et al. | 712/225 |
| 6,961,827 | B2 * | 11/2005 | Shanahan et al. | 711/144 |
| 7,120,755 | B2 * | 10/2006 | Jamil et al. | 711/141 |
| 2002/0181476 | A1 * | 12/2002 | Badamo et al. | 370/401 |
| 2003/0041228 | A1 | 2/2003 | Rosenbluth et al. | |
| 2003/0126365 | A1 | 7/2003 | Jamil et al. | |
| 2005/0050306 | A1 | 3/2005 | Lakshmanamurthy et al. | |

OTHER PUBLICATIONS

Int'l Application No. PCT/US2004/035923 Int'l Preliminary Report on Patentability dated Oct. 12, 2006.
Shah: Understanding Network Processors, Version 1.0 Sep. 4, 2001 93 pages.

(Continued)

*Primary Examiner*—Meng-Ai An
*Assistant Examiner*—Abdullah Al Kawsar
(74) *Attorney, Agent, or Firm*—Robert A. Greenberg

(57) ABSTRACT

In general, in one aspect, the disclosure describes a processor that includes an instruction store to store instructions of at least a portion of at least one program and multiple engines coupled to the shared instruction store. The engines provide multiple execution threads and include an instruction cache to cache a subset of the at least the portion of the at least one program from the instruction store, with different respective portions of the engine's instruction cache being allocated to different respective ones of the engine threads.

14 Claims, 9 Drawing Sheets

OTHER PUBLICATIONS

Gwennap et al: A Guide to Network Processors; 2nd Edition; Nov. 2001, The Linley Group, 16 pages.

The Next Generation of Intel IXP Network Processors; Intel Technology Journal, vol. 6, Issue 03; Aug. 15, 2002; ISSN 1535766X, 15 pages.

Intel IXP1200 Network Processor Family; Hardware Reference Manual; Aug. 2001; Part No. 278303-008; 272 pages.

Patterson et al. Computer Organization & Design; The Hardware/Software Interface; 2nd Edition; 1998; 4 pages.

Final Office Action for U.S. Appl. No. 10/704,432, mailed Aug. 31, 2006.

Advisory Action for U.S. Appl. No. 10/704,432, dated Oct. 19, 2006.

Pending U.S. Appl. No. 10/704,432, filed Nov. 6, 2003, inventor Lakshmanamurthy; Final Office Action dated Aug. 31, 2006.

Int'l Application No. PCT/US2004/035923 Int'l Search Report & Written Opinion dated Sep. 7, 2006.

Use of a Small L2 as Prefetch Buffer, IBM Technical Disclosure Bulletin, IBM Corp.. New York, US vol. 36, No. 12, Dec. 1, 1993, pp. 311-312, XP000418980).

Yen-Kuang Chen, et al. Evaluating and Improving Performance of Multimedia Applications on Simultaneous Mult-Threading; Parallel and Distributed Systems, 2002. Proceedings, 9th Int'l conf on Dec. 17-20, 2002; Piscataway, NJ, USA IEEE, pp. 529-534, XP010628954.

File history of U.S. Appl. No. 10/704,286 with various dates.

File history of U.S. Appl. No. 10/704,432 with various dates.

* cited by examiner

THREAD-BASED ENGINE CACHE PARTITIONING

REFERENCE TO RELATED APPLICATIONS

This application relates to the following applications filed on the same day as the present application:
a. "DYNAMICALLY CACHING ENGINE INSTRUCTIONS", U.S. Ser. No. 10/704,432, abandoned;
b. "SERVICING ENGINE CACHE REQUESTS", U.S. Ser. No. 10/704,286.

BACKGROUND

Networks enable computers and other devices to communicate. For example, networks can carry data representing video, audio, e-mail, and so forth. Typically, data sent across a network is divided into smaller messages known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately. For example, the header can include an address that identifies the packet's destination.

A given packet may "hop" across many different intermediate network devices (e.g., "routers", "bridges" and "switches") before reaching its destination. These intermediate devices often perform a variety of packet processing operations. For example, intermediate devices often perform operations to determine how to forward a packet further toward its destination or determine a quality of service to use in handling the packet.

As network connection speeds increase, the amount of time an intermediate device has to process a packet continues to dwindle. To achieve fast packet processing, many devices feature dedicated, "hard-wired" designs such as Application Specific Integrated Circuits (ASICs). These designs, however, are often difficult to adapt to emerging networking technologies and communication protocols.

To combine flexibility with the speed often associated with an ASIC, some network devices feature programmable network processors. Network processors enable software engineers to quickly reprogram network processor operations.

Often, again due to the increasing speed of network connections, the time it takes to process a packet greatly exceeds the rate at which the packets arrive. Thus, the architecture of some network processors features multiple processing engines that process packets simultaneously. For example, while one engine determines how to forward one packet, another engine determines how to forward a different one. While the time to process a given packet may remain the same, processing multiple packets at the same time enables the network processor to keep apace the deluge of arriving packets.

DETAILED DESCRIPTION

Figure 1:
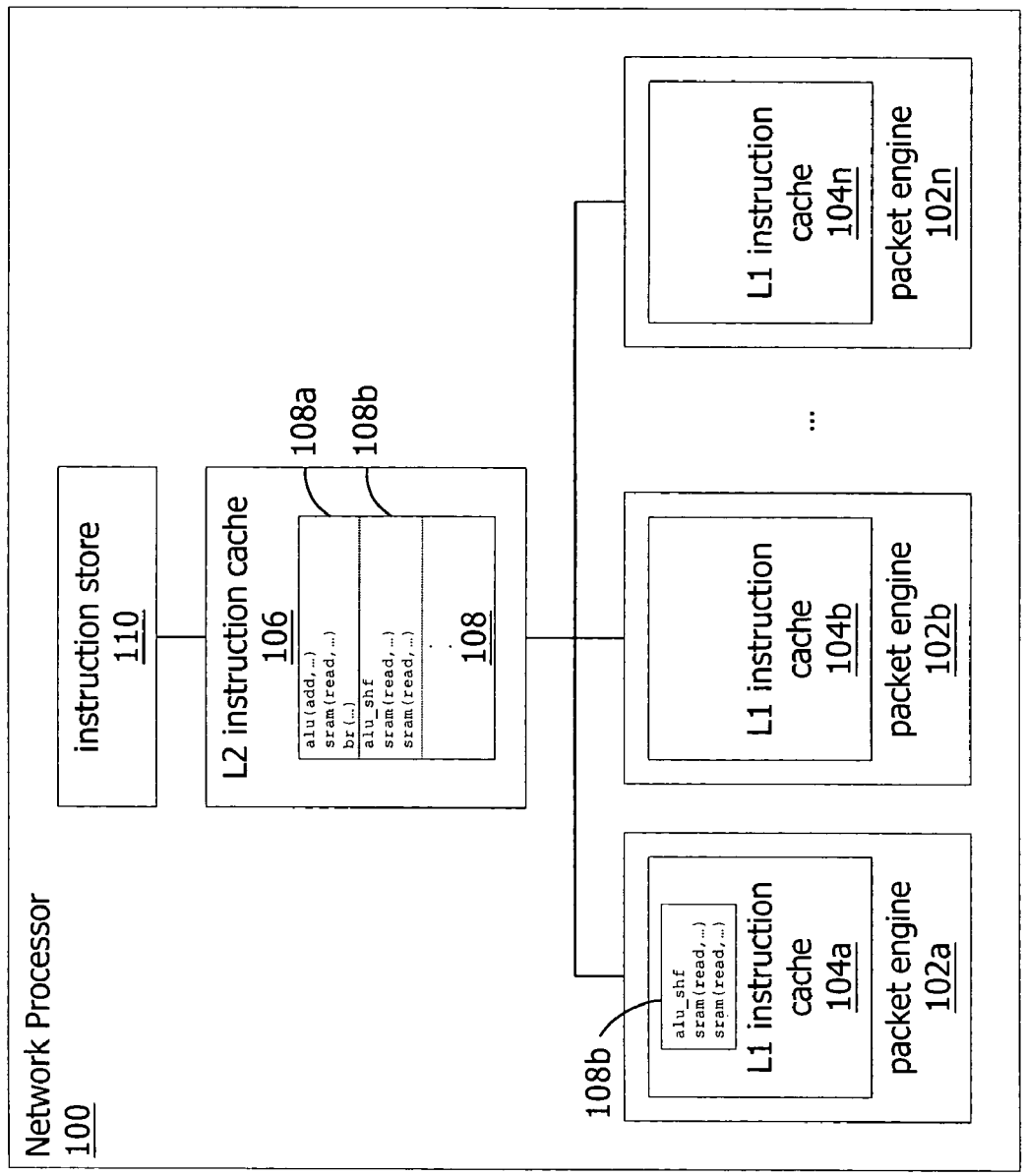
FIG. 1 is a diagram illustrating instruction caches of a network processor.

FIG. 1 depicts a network processor 100 that includes multiple processing engines 102. The engines 102 can be programmed to perform a wide variety of packet processing operations such as determining a packet's next hop, applying Quality of Service (QoS), metering packet traffic, and so forth. In the architecture shown, the engines 102 execute program instructions 108 stored in a high-speed local memory 104 of the engine 102. Due to size and cost constraints, the amount of instruction memory 104 provided by an engine 102 is often limited. To prevent the limited storage of engine memory 104 from imposing too stiff a restriction on the overall size and complexity of a program 108, FIG. 1 illustrates an example of an instruction caching scheme that dynamically downloads segments (e.g., 108b) of a larger program 108 to an engine 102 as the engine's 102 execution of the program 108 proceeds.

In the example shown in FIG. 1, each engine 102 includes an instruction cache 104 that stores a subset of program 108 instructions. For example, instruction cache 104a of packet engine 102a holds segment 108b of program 108. The remainder of the program 108 is stored in an instruction store 106 shared by the engines 102.

Eventually, the engine 102a may need to access a program segment other than segment 108b. For example, the program may branch or sequentially advance to a point within the program 108 outside segment 108b. To permit the engine 102 to continue program 108 execution, the network processor 100 will download requested/needed segment(s) to the engine's 102a cache 104a. Thus, the segment(s) stored by the cache dynamically change as program execution proceeds.

As shown in FIG. 1, multiple engines 102 receive instructions to cache from instruction store 106. The shared instruction store 106 may, in turn, cache instructions from a hierarchically higher instruction store 110 internal or external to the processor 100. In other words, instructions stores 104, 106, and 110 may form a cache hierarchy that include an L1 instruction cache 104 of the engine and an L2 instruction cache 106 shared by different engines.

While FIG. 1 depicts the instruction store 106 as serving all engines 102, a network processor 100 may instead feature multiple shared stores 106 that serve different sets of engines 102. For example, one shared instruction store 106 may store program instructions for engines #1 to #4 while another stores program instructions for engines #5 to #8. Additionally, while FIG. 1 depicted the engine cache 104 and instruction store 106 as storing instructions of a single program 108, they may instead store sets of instructions belonging to different programs. For instance, a shared instruction store 106 may store different program instructions for each engine 102 or even different engine 102 threads.

FIG. 1 depicts instructions 108 as source code to ease illustration. The actual instructions stored by the shared store 106 and distributed by to the engines would typically be executable instructions expressed in the instruction set provided by the engines.

Potentially, a program segment needed by an engine 102 to continue program execution may be provided on an "on-demand" basis. That is, the engine 102 may continue to execute instructions 108b stored in the instruction cache 104a until an instruction requiring execution is not found in the cache 104a. When this occurs, the engine 102 may signal the shared store 106 to deliver the program segment including the next instruction to be executed. This "on-demand" scenario, however, can introduce a delay into engine 102 execution of a program. That is, in the "on-demand" sequence, an engine 102 (or engine 102 thread) may sit idle until the needed instruction is loaded. This delay may be caused not only by the operations involved in downloading the needed instructions to the engine 102 L1 cache 104, but also by competition among the engines 102b-102n for access to the shared store 106.

Figure 2:
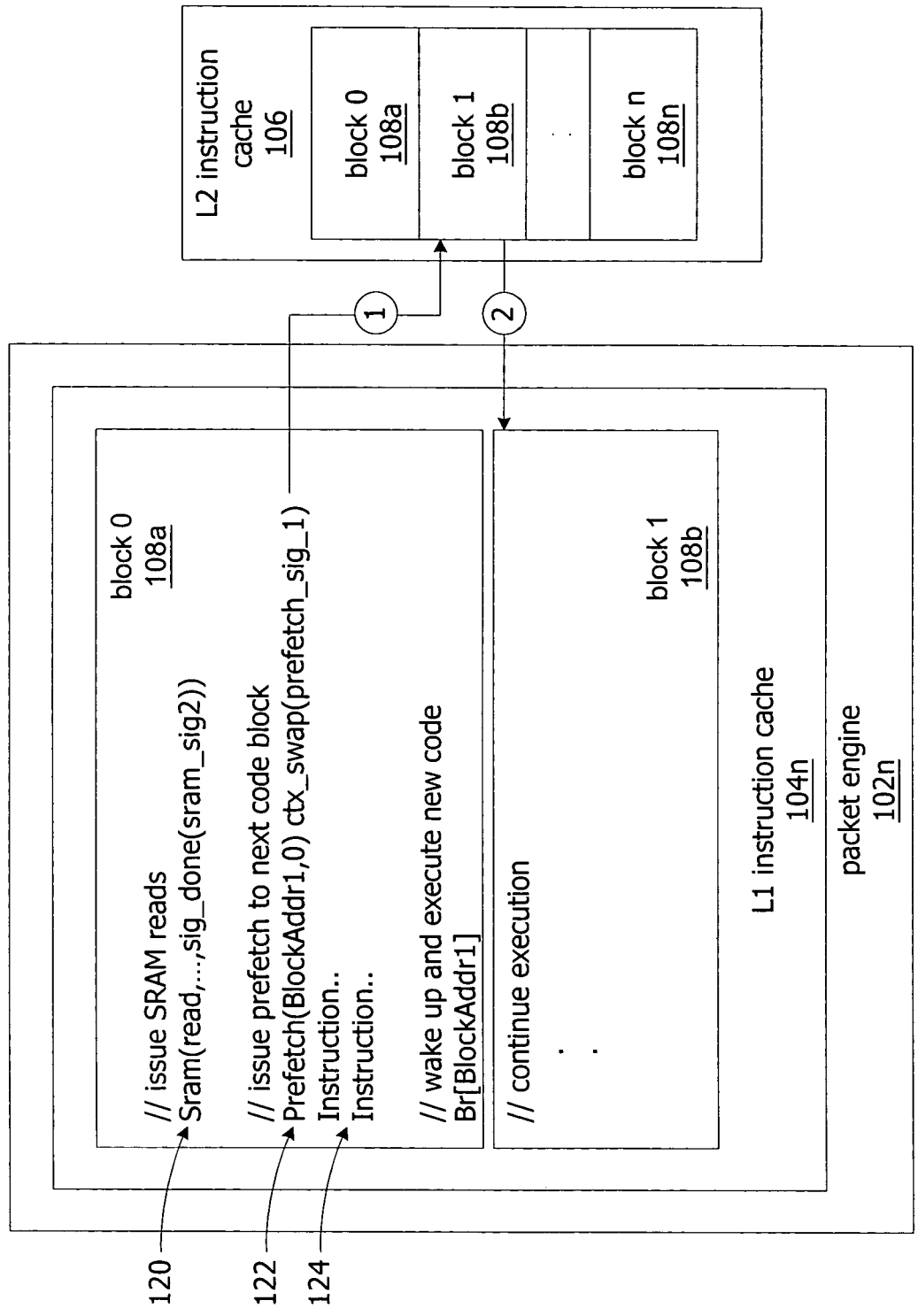
FIG. 2 is a diagram illustrating operation of an instruction to fetch instructions into an engine's instruction cache.

To, potentially, avoid this delay, FIG. 2 depicts a portion of a program source code listing that includes a fetch instruction 122 that allows the program to initiate a "prefetch" of program instructions into the engine's cache 104 ahead of the time when the instructions will be required to continue execution of a program. For example, as shown in FIG. 2, the fetch instruction 122 causes the engine 102n to issue ("1") a request to the shared instruction store 106 for the next needed segment 108b before execution advances to a point within the next segment 108b. While the engine 102 continues processing instructions 124 following the fetch instruction 122, the requested segment 108b is loaded into the engine's 102n instruction cache 104n. In other words, the time used to retrieve ("2") a program segment overlaps the time between engine execution of the pre-fetch instruction 122 and the time the engine 102 "runs out" of instructions to execute in the currently cached program segment(s).

In the example shown in FIG. 2, the time to retrieve program instructions was concealed by the time spent executing instructions 122 following the fetch instruction. The fetch delay may also be "hidden" by executing the fetch instruction after instructions 120 (e.g., memory operations) that take some time to complete.

The sample fetch instruction shown in FIG. 2 has a syntax of:

Prefetch (SegmentAddress,SegmentCount)[, optional_token]

where the SegmentAddress identifies the starting address of the program to retrieve from the shared store 106 and the SegmentCount identifies the number of subsequent segments to fetch. Potentially, the SegmentAddress may be restricted to identify the starting address of program segments.

The optional_token has a syntax of:

optional_token=[ctx_swap[signal],][sig_done[signal]]

The ctx_swap parameter instructs an engine 102 to swap to another engine thread of execution until a signal indicates completion of the program segment fetch. The sig_done parameter also identifies a status signal to be set upon completion of the fetch, but does not instruct the engine 102 to swap contexts.

The instruction syntax shown in FIG. 2 is merely an example and other instructions to fetch program instructions may feature different parameters, keywords, and feature different options. Additionally, the instruction may exist at different levels. For example, the instruction may be part of the instruction set of an engine. Alternately, the instruction may be a source code instruction processed by a compiler to generate target instructions (e.g., engine executable instructions) corresponding to the fetch instruction. Such a compiler may perform other traditional compiler operations such as lexical analysis to group text characters of source code into "tokens", syntax analysis that groups the tokens into grammatical phrases, intermediate code generation that more abstractly represents the source code, optimization, and so forth.

A fetch instruction may be manually inserted by a programmer during code development. For example, based on initial classification of a packet, the remaining program flow for the packet may be known. Thus, fetch instructions may retrieve the segments needed to process a packet after the classification. For example, a program written in a high-level language may include instructions of:

```
switch(classify(packet.header)) {
    case DropPacket: {
        prefetch(DropCounterInstructions);
    }
    case ForwardPacket {
        prefetch(RoutingLookupInstructions)
        prefetch(PacketEnqueueInstructions);
    } }
``` which load the appropriate program segment(s) into an engine's 102 instruction cache 104 based on the packet's classification.

While a programmer may manually insert fetch instructions into code, the fetch instruction may also be inserted into code by a software development tool such as a compiler, analyzer, profiler, and/or pre-processor. For example, code flow analysis may identify when different program segments should be loaded. For instance, the compiler may insert the fetch instruction after a memory access instruction or before a set of instructions that take some time to execute.

Figure 3:
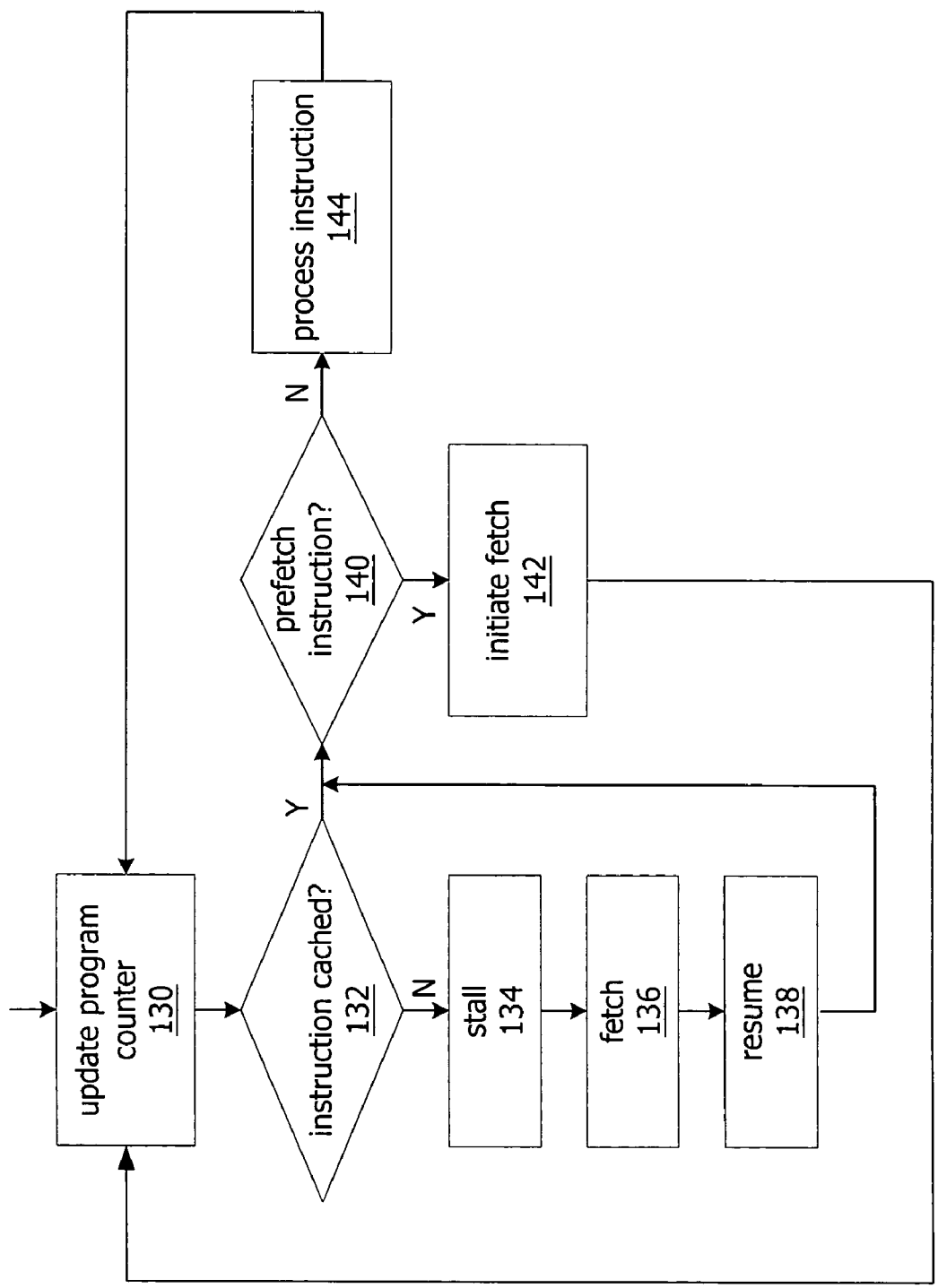
FIG. 3 is a flow-chart illustrating instruction processing performed by a network processor engine.

FIG. 3 depicts a flow-chart illustrating operation of an engine that retrieves instructions both "on-demand" and in response to "fetch" instructions. As shown in FIG. 3, a program counter 130 identifying the next program instruction to execute is updated. For example, the program counter 130 may be incremented to advance to a next sequential instruction address or the counter 130 may be set to some other instruction address in response to a branch instruction. As shown, an engine determines 132 whether the engine's instruction cache currently holds the instruction identified by the program counter. If not, the engine thread stalls 134 (e.g., the thread requiring the instruction is swapped out of the engine) until 138 a fetch 136 retrieves the missing instruction from the shared store.

Once an instruction to be executed is present in the engine's instruction cache, the engine can determine 140 whether the next instruction to execute is a fetch instruction. If so, the engine can initiate a fetch 142 of the requested program segment(s). If not, the engine can process 144 the instruction as usual.

Figure 4:
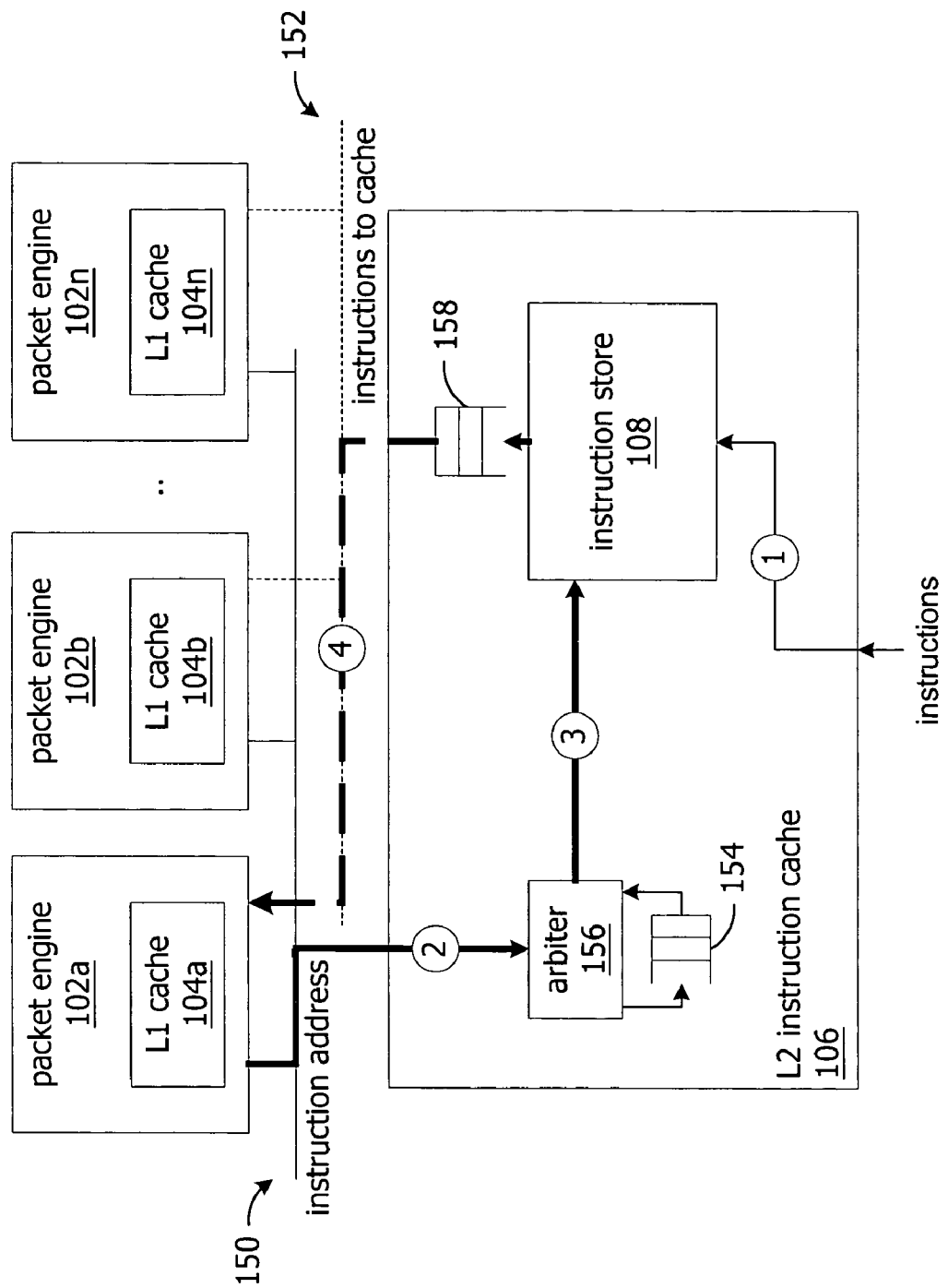
FIG. 4 is a flow-diagram illustrating caching of instructions.

FIG. 4 depicts a sample architecture of a shared instruction cache 106. The instruction cache 106 receives instructions ("1") to share with the engines, for example, during network processor startup. Thereafter, the shared instruction cache 106 distributes portions of the instructions 108 to the engines as needed and/or requested.

As shown in the sample architecture of FIG. 4, two different busses 150, 152 may connect the shared cache 106 to the engines 102. Bus 150 carries ("2") fetch requests to the shared cache 106. These requests can identify the program segment(s) 108 to fetch and the engine making the request. The requests may also identify whether the request is a pre-fetch or an "on-demand" fetch. A high-bandwidth bus 152 carries ("4") instructions in the requested program segment(s) back to the requesting engine 102. The bandwidth of bus 152 may permit the shared cache 106 to deliver requested instructions to multiple engines simultaneously. For example, the bus 152 may be divided into n-lines that can be dynamically allocated to the engines. For example, if four engines request segments, each can be allocated 25% of the bus bandwidth.

As shown, the shared cache 106 may queue requests as they arrive, for example, in a (First-In-First-Out) FIFO queue 154 for sequential servicing. However, as described above, when an instruction to be executed has not been loaded into an engine's instruction cache 104, the thread stalls. Thus, servicing an "on-demand" request causing an actual stall represents a more pressing matter than servicing a "prefetch" request which may or may not result in a stall. As shown, the shared cache 106 includes an arbiter 156 that can give priority to demand requests over prefetch requests. The arbiter 156 may include dedicated circuitry or may be programmable.

The arbiter 156 can prioritize demand requests in a variety of ways. For example, the arbiter 156 may not add the demand request to the queue 154, but may instead present the request for immediate servicing ("3"). To prioritize among multiple "demand" requests, the arbiter 156 may also maintain a separate "demand" FIFO queue given priority by the arbiter 156 over requests in FIFO queue 154. The arbiter 156 may also immediately suspend on-going instruction downloads to service a demand request. Further, the arbiter 156 may allocate a substantial portion, if not 100%, of the bus 152 bandwidth to delivering segment instructions to the engine issuing an "on-demand" request.

Figure 5:
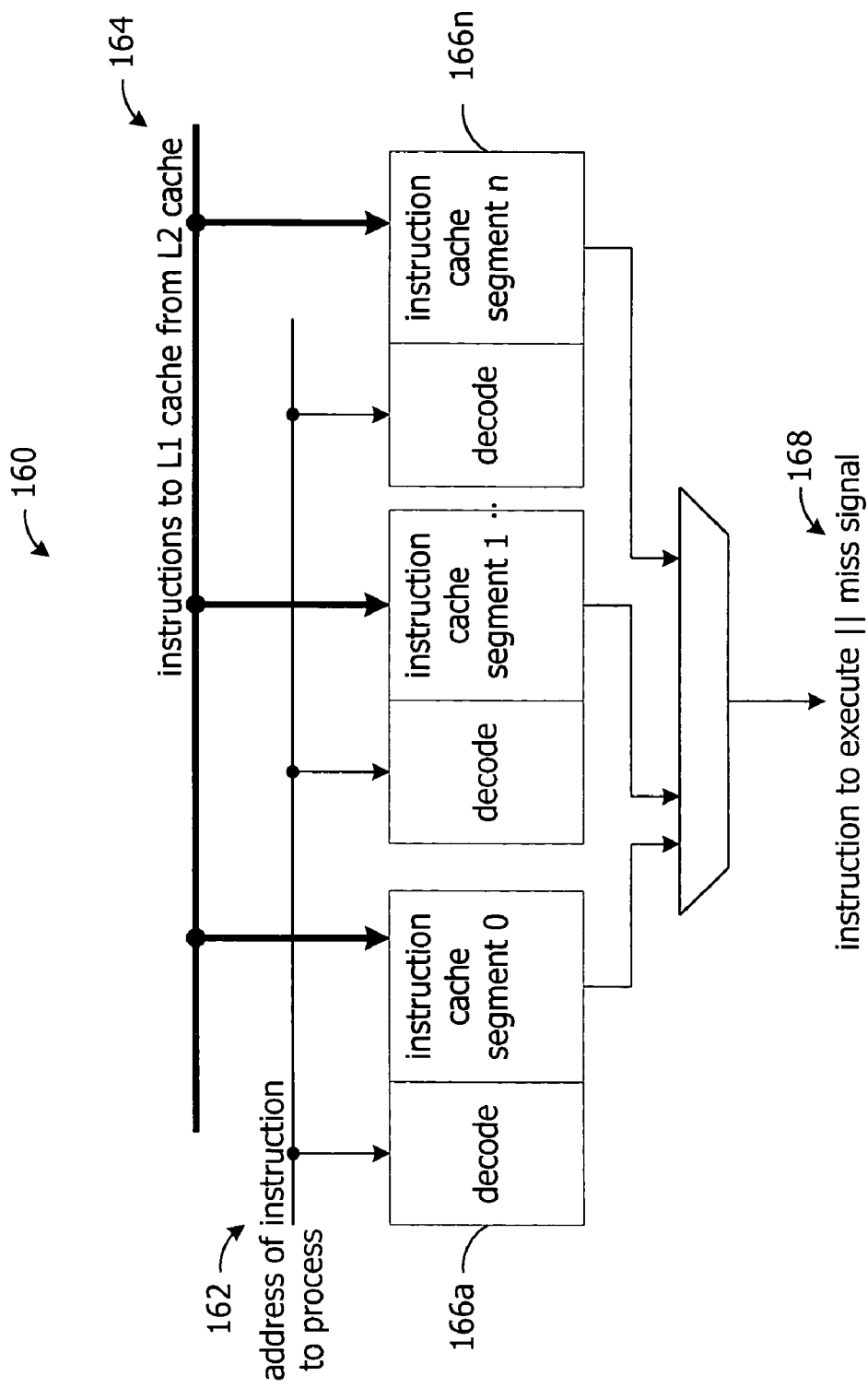
FIG. 5 is a diagram illustrating engine circuitry to search for cached instructions.

FIG. 5 illustrates a sample architecture of an engine's instruction cache. As shown, cache storage is provided by a collection of memory devices 166x that store instructions received from the shared instruction store 106 over bus 164. An individual memory element 166a may be sized to hold one program segment. As shown, each memory 166x is associated with an address decoder that receives the address of an instruction to be processed from the engine and determines whether the instruction is present within the associated memory 166. The different decoders operate on an address in parallel. That is, each decoder searches its associated memory at the same time. If found within one of the memories 166x, that memory 166x unit outputs 168 the requested instruction for processing by the engine. If the instruction address is not found in any of the memories 166, a "miss" signal 168 is generated.

As described above, an engine may provide multiple threads of execution. In the course of execution, these different threads will load different program segments into the engine's instruction cache. When the cache is filled, loading segments into the cache requires some other segment to be removed from the cache ("victimization"). Without some safeguard, a thread may victimize a segment currently being used by another thread. When the other thread resumes processing, the recently victimized segment may be fetched again from the shared cache 106. This inter-thread thrashing of the instruction cache 104 may repeat time and again, significantly degrading system performance as segments are loaded into a cache by one thread only to be prematurely victimized by another and reloaded a short time later.

Figure 6:
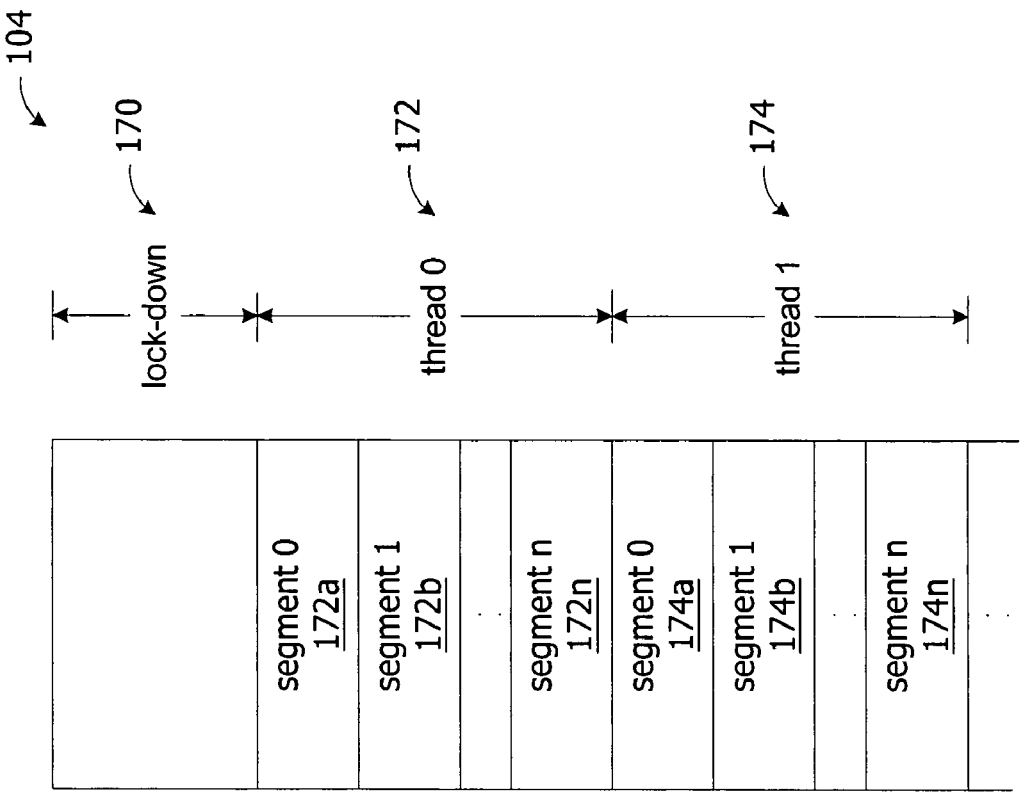
FIG. 6 is a map of instruction cache memory allocated to different threads of a network processor engine.

To combat such thrashing, a wide variety of mechanisms can impose limitations on the ability of threads to victimize segments. For example, FIG. 6 depicts a memory map of an engine's instruction cache 104 where each engine thread is exclusively allocated a portion of the cache 104. For example, thread 0 172 is allocated memory for N program segments 172a, 172b, 172n. Instruction segments fetched for a thread can reside in the thread's allocation of the cache 104. To prevent thrashing, logic may restrict one thread from victimizing segments from cache partitions allocated to other threads.

To quickly access cached segments, a control and status registers (CSR) associated with a thread may store a starting address of an allocated cache portion. This address may be computed, for example, based on the number of threads (e.g., allocation-starting-address=base-address+(thread#×allocated-memory-per-thread)). Each partition may be further divided into segments that correspond, for example, to a burst fetch size from the shared store 106 or other granularity of transfers from the shared store 106 to the engine cache. LRU (least recently used) information may be maintained for the different segments in a thread's allocated cache portion. Thus, in an LRU scheme, the segment least recently used in a given thread's cache may be the first to be victimized.

In addition to a region divided among the different threads, the map shown also includes a "lock-down" portion 170. The instructions in the locked down region may be loaded at initialization and may be protected from victimization. All threads may access and execute instructions stored in this region.

A memory allocation scheme such as the scheme depicted in FIG. 6 can prevent inter-thread thrashing. However, other approaches may also be used. For example, an access count may be associated with the threads currently using a segment. When the count reaches zero, the segment may be victimized. Alternately, a cache victimization scheme may apply different rules. For example, the scheme may try to avoid victimizing a loaded segment which has not yet been accessed by any thread.

Figure 7:
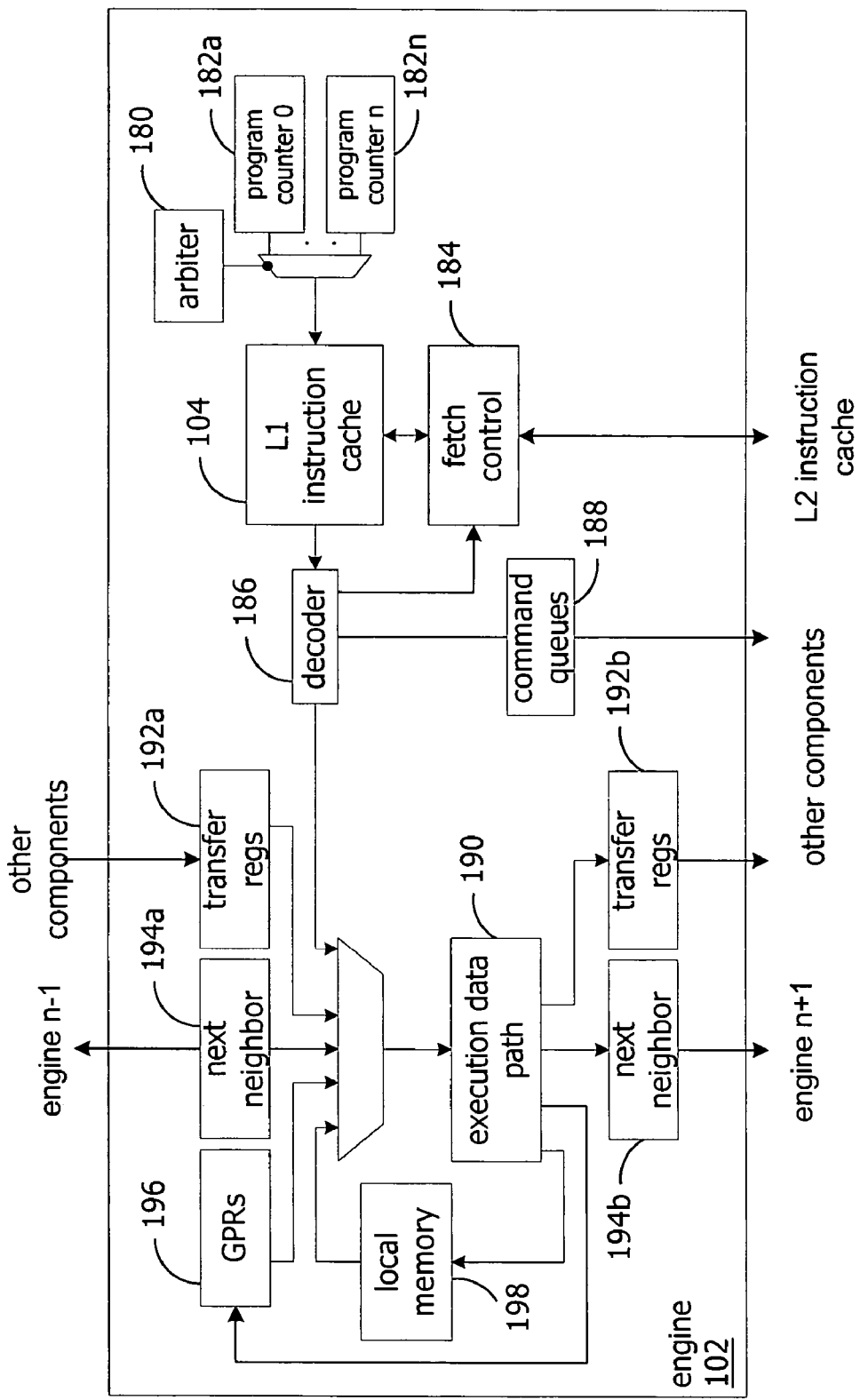
FIG. 7 is a diagram of a network processor engine.

FIG. 7 illustrates a sample engine 102 architecture. The engine 102 may be a Reduced Instruction Set Computing (RISC) processor tailored for packet processing. For example, the engines 102 may not provide floating point or integer division instructions commonly provided by the instruction sets of general purpose processors.

The engine 102 may communicate with other network processor components (e.g., shared memory) via transfer registers 192a, 192b that buffer data to send to/received from the other components. The engine 102 may also communicate with other engines 102 via "neighbor" registers 194a, 194b hard-wired to other engine(s).

The sample engine 102 shown provides multiple threads of execution. To support the multiple threads, the engine 102 stores a program context 182 for each thread. This context 182 can include thread state data such as a program counter. A thread arbiter 182 selects the program context 182x of a thread to execute. The program counter for the selected context is fed to an instruction cache 104. The cache 104 can initiate a program segment fetch when the instruction identified by the program counter is not currently cached (e.g., the segment is not in the lock-down cache region or the region allocated to the currently executing thread). Otherwise, the cache 104 can send the cached instruction to the instruction decode unit 186. Potentially, the instruction decode unit 190 may identify the instruction as a "fetch" instruction and may initiate a segment fetch. Otherwise the decode 190 unit may feed the instruction to an execution unit (e.g., an ALU) for processing or may initiate a request to a resource shared by different engines (e.g., a memory controller) via command queue 188.

A fetch control unit 184 handles retrieval of program segments from the shared cache 106. For example, the fetch control unit 184 can negotiate for access to the shared cache request bus, issue a request, and store the returned instructions in the instruction cache 104. The fetch control unit 184 may also handle victimization of previously cached instructions.

The engine's 102 instruction cache 104 and decoder 186 form part of an instruction processing pipeline. That is, over the course of multiple clock cycles, an instruction may be loaded from the cache 104, decoded 186, instruction operands loaded (e.g., from general purpose registers 196, next neighbor registers 194a, transfer registers 192a, and local memory 198), and executed by the execution data path 190. Finally, the results of the operation may be written (e.g., to general purpose registers 196, local memory 198, next neighbor registers 194b, or transfer registers 192b). Many instructions may be in the pipeline at the same time. That is, while one is being decoded another is being loaded from the L1 instruction cache 104.

Figure 8:
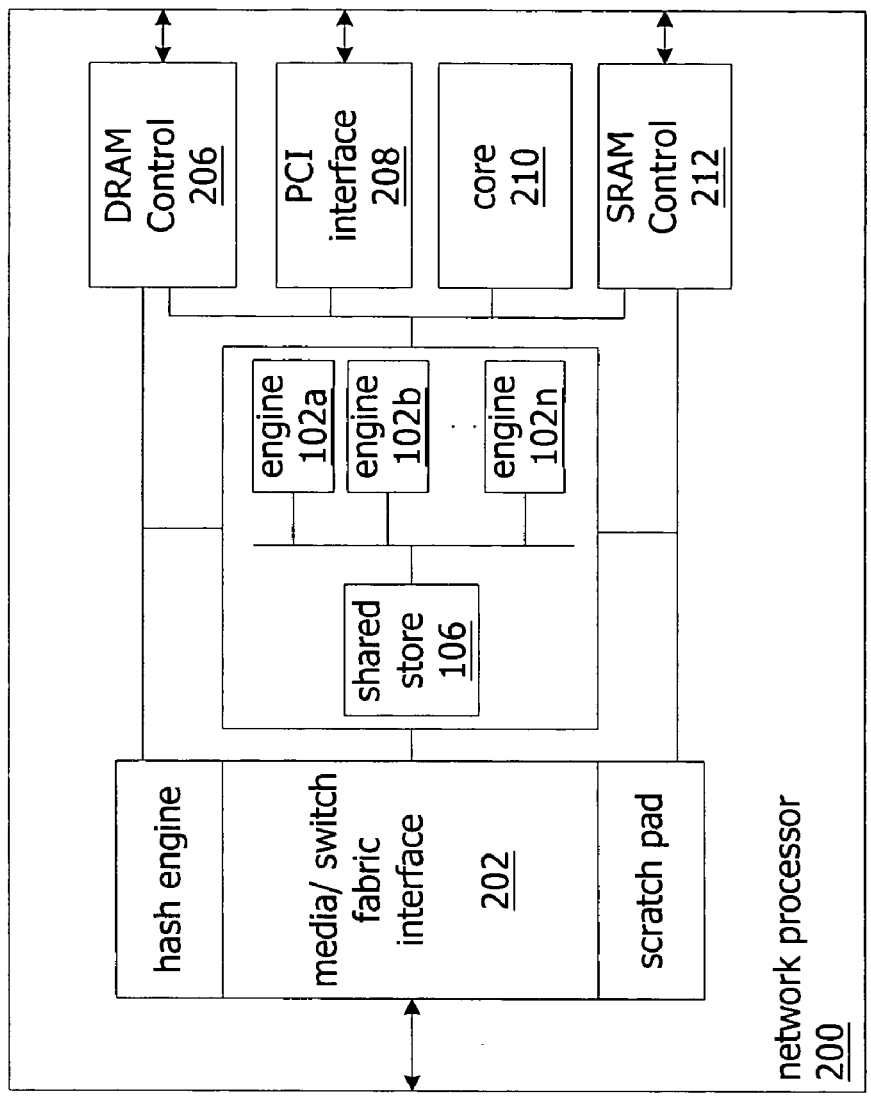
FIG. 8 is a diagram of a network processor.

FIG. 8 depicts an example of network processor 200. The network processor 200 shown in an Intel® Internet eXchange network Processor (IXP). Other network processors feature different designs.

The network processor 200 shown features a collection of packet engines 204 integrated on a single die. As described above, an individual packet engine 204 may offer multiple threads. The processor 200 may also include a core processor 210 (e.g., a StrongARM® XScale®) that is often programmed to perform "control plane" tasks involved in network operations. The core processor 210, however, may also handle "data plane" tasks and may provide additional packet processing threads.

As shown, the network processor 200 also features interfaces 202 that can carry packets between the processor 200 and other network components. For example, the processor 200 can feature a switch fabric interface 202 (e.g., a Common Switch Interface (CSIX) interface) that enables the processor 200 to transmit a packet to other processor(s) or circuitry connected to the fabric. The processor 200 can also feature an interface 202 (e.g., a System Packet Interface (SPI) interface) that enables to the processor 200 to communicate with physical layer (PHY) and/or link layer devices. The processor 200 also includes an interface 208 (e.g., a Peripheral Component Interconnect (PCI) bus interface) for communicating, for example, with a host. As shown, the processor 200 also includes other components shared by the engines such as memory controllers 206, 212, a hash engine, and scratch pad memory.

Figure 9:
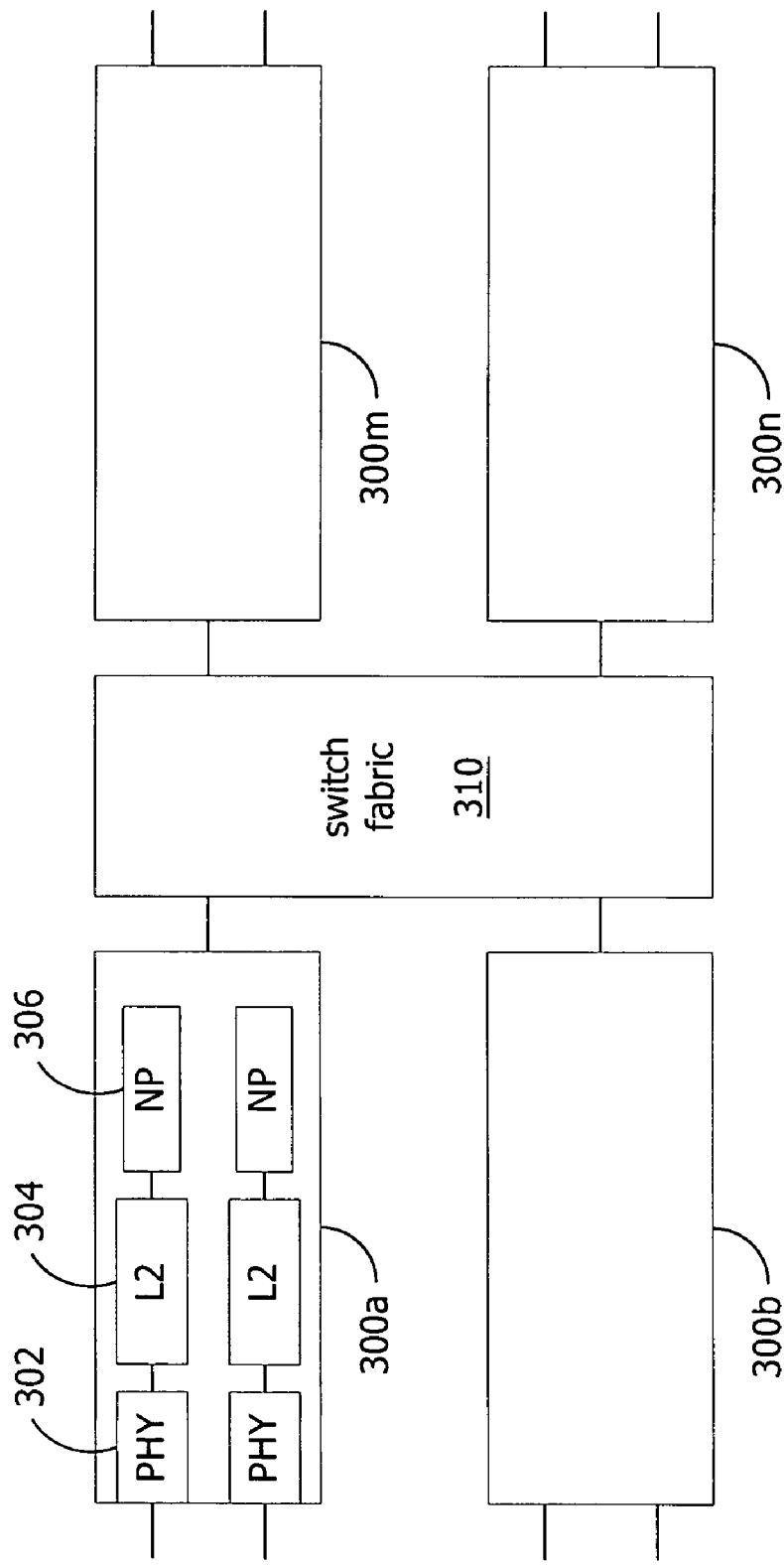
FIG. 9 is a diagram of a network device.

The packet processing techniques described above may be implemented on a network processor, such as the IXP, in a wide variety of ways. For example, the core processor 210 may deliver program instructions to the shared instruction cache 106 during network processor bootup. Additionally, instead of a "two-deep" instruction cache hierarchy, the processor 200 may feature an N-deep instruction cache hierarchy, for example, when the processor features a very large number of engines FIG. 9 depicts a network device incorporating techniques described above. As shown, the device features a collection of line cards 300 ("blades") interconnected by a switch fabric 310 (e.g., a crossbar or shared memory switch fabric). The switch fabric, for example, may conform to CSIX or other fabric technologies such as HyperTransport, Infiniband, Peripheral Component Interconnect-Express (PCI-X), and so forth.

Individual line cards (e.g., 300a) may include one or more physical layer (PHY) devices 302 (e.g., optic, wire, and wireless PHYs) that handle communication over network connections. The PHYs translate between the physical signals carried by different network mediums and the bits (e.g., "0"-s and "1"-s) used by digital systems. The line cards 300 may also include framer devices (e.g., Ethernet, Synchronous Optic Network (SONET), High-Level Data Link (HDLC) framers or other "layer 2" devices) 304 that can perform operations on frames such as error detection and/or correction. The line cards 300 shown also include one or more network processors 306 using instruction caching techniques described above. The network processors 306 are programmed to perform packet processing operations for packets received via the PHY(s) 300 and direct the packets, via the switch fabric 310, to a line card providing the selected egress interface. Potentially, the network processor(s) 306 may perform "layer 2" duties instead of the framer devices 304.

While FIGS. 8 and 9 described sample architectures of an engine, network processor, and a device incorporating network processors, the techniques may be implemented in other engine, network processor, and device designs. Additionally, the techniques may be used in a wide variety of network devices (e.g., a router, switch, bridge, hub, traffic generator, and so forth).

The term circuitry as used herein includes hardwired circuitry, digital circuitry, analog circuitry, programmable circuitry, and so forth. The programmable circuitry may operate on computer programs.

Such computer programs may be coded in a high level procedural or object oriented programming language. However, the program(s) can be implemented in assembly or machine language if desired. The language may be compiled or interpreted. Additionally, these techniques may be used in a wide variety of networking environments.

Other embodiments are within the scope of the following claims.

What is claimed is:

1. A processor, comprising:
    an instruction store configured to store instructions of at least a portion of at least one program; and
    multiple engines coupled to the instruction store, individual ones of the multiple engines providing multiple execution threads, wherein each said multiple engines include an engine instruction cache to cache a subset of the at least the portion of the at least one program from the instruction store, different respective portions of the engine instruction cache being allocated to different respective ones of the threads, the engine instruction cache including a shared portion allocated for sharing by the threads, the shared portion storing instructions that are not victimized;
    wherein the instruction store comprises an L2 instruction cache and the engine instruction store comprises an L1 instruction cache; and
    wherein the processor further comprising at least one of the following: an interface to a switch fabric, an interface to a media access controller (MAC), and an interface to a physical layer (PHY) device.

2. The processor of claim 1, wherein the engine instruction cache comprises multiple cache memories and multiple instruction address decoders.

3. The processor of claim 1, further comprising a second instruction store coupled to a second set of multiple engines.

4. The processor of claim 1, wherein one of the multiple engine threads cannot victimize instructions stored in portions of the engine instruction cache allocated to another thread.

5. The processor of claim 1, wherein one of the cache portions allocated to one of the multiple execution threads comprises a portion sized to hold an integral number of program segments.

6. A method performed by a processor comprising at least one of the following: an interface to a switch fabric, an interface to a media access controller (MAC), and an interface to a physical layer (PHY) device, wherein the method comprises:
storing instructions of at least a portion of at least one program in an instruction store;
accessing the instruction store by multiple coupled engines, each of the multiple engines providing multiple execution threads, wherein each said multiple engines include an engine instructions cache to cache a subset of the at least the portion of the at least one program from the instruction store;
allocating different portions of the engine instruction cache to different respective ones of the multiple execution threads provided by the engine; and
sharing a portion of the engine instruction cache among the threads, the shared portion storing instructions that are not victimized;
wherein the instruction store comprises an L2 instruction cache and the engine instructions cache comprises an L1 instruction cache.

7. The method of claim 6,
further comprising receiving instructions to store in the engine instruction cache from an instruction store shared by multiple engines.

8. The method of claim 6, further comprising:
executing by the threads instructions in the, respective, allocated portions of the cache.

9. The method of claim 8, wherein the executing comprises processing packets.

10. A computer program product, disposed on a computer readable medium, comprising program instructions for causing an engine in a processor configured to store instructions of at least a portion of at least one program in an instruction store and coupling multiple engines to the instruction store, each of the multiple engines providing multiple execution threads, wherein each said multiple engines include an engine instruction cache to cache a subset of the at least the portion of the at least one program from the instruction store, to:
allocate different portions of the engine instruction cache to different respective ones of the multiple execution threads provided by the engine; and
share a shared portion of the engine instruction cache among the threads, the shared portion storing instructions that are not victimized;
wherein the instruction store comprises an L2 instruction cache and the engine instruction cache comprises an L1 instruction cache;
wherein the processor further comprises at least one of the following: an interface to a switch fabric, an interface to a media access controller (MAC), and an interface to a physical layer (PHY) device.

11. The program of claim 10,
further comprising program instructions to cause an engine to:
store in the engine instruction cache instructions received from an instruction store shared by multiple engines.

12. A network forwarding device, comprising:
a switch fabric;
a set of line cards interconnected by the switch fabric, at least one of the set of line cards comprising:
at least one physical layer device (PHY); and
at least one network processor, the network processor comprising:
an instruction store;
a set of multi-threaded engines operationally coupled to the instruction store, individual ones of the set of engines comprising:
multiple execution threads and an engine instruction cache to cache a subset of the at least the portion of the at least one program from the instruction store, different respective portions of the engine instruction cache being allocated to different respective ones of the threads, the engine instruction cache including a shared portion allocated for sharing by the threads, the shared portion configured to store instructions and to protect the instructions from victimization;
wherein the instruction store comprises an L2 instruction cache and the engine instruction cache comprises an L1 instruction cache 13. The network forwarding device of claim 12, further comprising
a second instruction store; and
a second set of multi-threaded engines operationally coupled to the second instruction store.

14. The network forwarding device of claim 12, wherein the circuitry to allocation different portions of the engine instruction cache comprises circuitry to allocate a portion of the engine instruction cache shared by the threads.

* * * * *